(12) United States Patent
Yamasaki (10) Patent No.: US 9,432,567 B2
(45) Date of Patent: Aug. 30, 2016

(54) IMAGE PICKUP APPARATUS AND IMAGING METHOD THAT PERFORM FOCUS ACTION FOLLOWING ZOOM ACTION

(71) Applicant: CANON KABUSHIKI KAISHA, Tokyo (JP)

(72) Inventor: Ryo Yamasaki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 81 days.

(21) Appl. No.: 14/316,289

(22) Filed: Jun. 26, 2014

(65) Prior Publication Data

US 2015/0002725 A1 Jan. 1, 2015

(30) Foreign Application Priority Data

Jun. 27, 2013 (JP) ................................. 2013-135141

(51) Int. Cl.
*H04N 5/232* (2006.01)
*G02B 7/28* (2006.01)
*G03B 13/36* (2006.01)

(52) U.S. Cl.
CPC .......... *H04N 5/23212* (2013.01); *G02B 7/282* (2013.01); *G03B 13/36* (2013.01); *H04N 5/23296* (2013.01)

(58) Field of Classification Search
CPC ..................... H04N 5/23212; H04N 5/23296; G03B 13/36; G02B 7/282
See application file for complete search history.

(56) References Cited

U.S. PATENT DOCUMENTS

| | | | | |
|---|---|---|---|---|
| 5,438,190 A * | 8/1995 | Kaneda | ........... | G02B 7/102 250/201.3 |
| 5,790,902 A * | 8/1998 | Mizouchi | ........... | G02B 7/102 396/142 |
| 5,815,203 A | 9/1998 | Lee et al. | | |
| 6,249,389 B1 * | 6/2001 | Ohtake | ........... | G02B 15/173 359/676 |
| 6,989,865 B1 * | 1/2006 | Ohta | ........... | H04N 5/232 348/347 |

(Continued)

FOREIGN PATENT DOCUMENTS

| | | |
|---|---|---|
| CN | 1165313 A | 11/1997 |
| CN | 102236147 A | 11/2011 |
| CN | 102385137 A | 3/2012 |

(Continued)

OTHER PUBLICATIONS

The above patent documents were cited in a Feb. 1, 2016 Chinese Office Action, which is enclosed with an English Translation, that issued in Chinese Patent Application No. 201410300703.6.

*Primary Examiner* — Daniel M Pasiewicz
(74) *Attorney, Agent, or Firm* — Cowan, Liebowitz & Latman, P.C.

(57) ABSTRACT

An image pickup apparatus capable of performing a focus adjustment with accuracy and in short time even when a focal position deviation is caused due to a delay of a focus action relative to a zoom action performed responding to a zoom operation. When a focal position of the lens unit changes with execution of a zoom operation, a lens controller drives a focus lens group in such a manner that the focus lens group moves following the zoom operation and the focal position is made constant. A focus detector performs focus detection based on an optical image. According to a focus detection result, the focus lens group is driven for focus adjustment. During the follow-up movement of the focus lens group, a camera controller stops the focus adjustment until a defocusing amount obtained from the focus detection result becomes smaller than a first predetermined value.

4 Claims, 8 Drawing Sheets

(56) References Cited

U.S. PATENT DOCUMENTS

2011/0267706 A1* 11/2011 Karasawa .......... H04N 5/23212
359/698
2013/0083234 A1* 4/2013 Shigeta .................. H04N 5/232
348/360

FOREIGN PATENT DOCUMENTS

| CN | 102687052 A | 9/2012 |
|---|---|---|
| JP | 04-350612 A | 12/1992 |
| JP | 2007-233035 A | 9/2007 |

* cited by examiner

IMAGE PICKUP APPARATUS AND IMAGING METHOD THAT PERFORM FOCUS ACTION FOLLOWING ZOOM ACTION

BACKGROUND OF THE INVENTION

1. Field of the Invention

The present invention relates to image pickup apparatus and method in which a focus action is followed to a zoom action.

2. Description of the Related Art

A digital camera or other image pickup apparatus or an interchangeable lens unit therefor is sometimes mounted with a varifocal type lens or lens unit (hereinafter, referred to as the varifocal lens unit). The varifocal lens unit is advantageous in that it is capable of being small-sized and capable of changing a focal distance (photographing range) to photograph an object that is at a close distance or at a far distance. In the varifocal lens unit, however, a focal position (focusing position) changes with a change of focal distance, and therefore a focus adjustment must be made.

Accordingly, in an image pickup apparatus with varifocal lens unit, a focus action is sometimes performed to drive and move the focus lens interlockingly with a zoom operation so that the focal position does not change during the zoom operation. For example, drive amounts of focus lens corresponding to amounts of zoom operation are stored beforehand in a memory. During the zoom operation, an amount of zoom operation is detected, a drive amount of focus lens corresponding to the zoom operation amount is determined referring to stored contents of the memory, and the focus lens is driven and moved.

In an image pickup apparatus having a main unit attached with an interchangeable lens unit with varifocal lens unit, the focus lens is driven to an in-focus position according to a result of focus detection by a focus detector mounted to the main unit of the apparatus. Some image pickup apparatus of this type is configured to perform a varifocal correction (focus adjustment) at a proper timing when the focus lens is driven into focus during a zoom operation according to a result of focus detection (see, Japanese Laid-open Patent Publication No. H4-350612).

In the image pickup apparatus with varifocal lens unit, however, a focus follow-up delay sometimes occurs. In other words, a focus action (a follow-up movement of the focus lens) sometimes lags behind a zoom action, which is performed responding to the zoom operation. In particular, in a single-lens reflex digital camera of a lens replacement type (such as one disclosed in Japanese Laid-open Patent Publication No. H4-350612) where a manual zoom operation mechanism is used, when a manual zoom operation is performed at high speed, the focus action inevitably lags behind the zoom action responding to the zoom operation. As a result, a large deviation of focal position is caused, which results in a blur state. Therefore, the focus detection cannot be satisfactorily performed. In that case, a focus search operation must be made, resulting in an increase of time required to achieve focusing.

In recent years, the varifocal lens unit has been often used in image pickup apparatuses adapted to moving image photographing. With the image pickup apparatus of this type, an extremely large deviation of focal position is caused at the time of zoom operation, especially, when an object located at a close distance is zoomed to high magnification. Thus, an extremely long time is required to achieve focusing.

SUMMARY OF THE INVENTION

The present invention provides image pickup apparatus and method that are capable of performing a focus adjustment with accuracy and in short time even when a focal position deviation is caused due to a delay of a focus action relative to a zoom action performed responding to a zoom operation.

According to one aspect of this invention, there is provided an image pickup apparatus comprising a follow-up unit configured to perform a follow-up action where a focus action, in which a focus lens is moved in an optical axis direction so as to correct a change in optical image-formed position on an imaging element caused by a zoom operation, is followed to a zoom action that is performed responding to the zoom operation, and an auto-focus adjustment unit configured to perform an auto-focus adjustment by moving the focus lens in the optical axis direction according to a focus detection result, wherein in a case where an instruction for the auto-focus adjustment is given while the follow-up action is being performed by the follow-up unit, the auto-focus adjustment unit operates in a mode in which the auto-focus adjustment is not executed until a defocusing amount obtained from the focus detection result becomes smaller than a predetermined value.

With this invention, during the follow-up action in which a focus action is followed to a zoom action responding to a zoom operation, a focus adjustment is not executed until a defocusing amount obtained based on a focus detection result becomes smaller than a predetermined value. As a result, even if a focal position deviation is caused due to a focus follow-up delay (i.e., a delay of the focus action relative to the zoom action), the focus adjustment for focusing can be carried out in short time and with accuracy.

Further features of the present invention will become apparent from the following description of exemplary embodiments (with reference to the attached drawings).

DESCRIPTION OF THE EMBODIMENTS

The present invention will now be described in detail below with reference to the drawings showing preferred embodiments thereof.

(First Embodiment)

Figure 1:
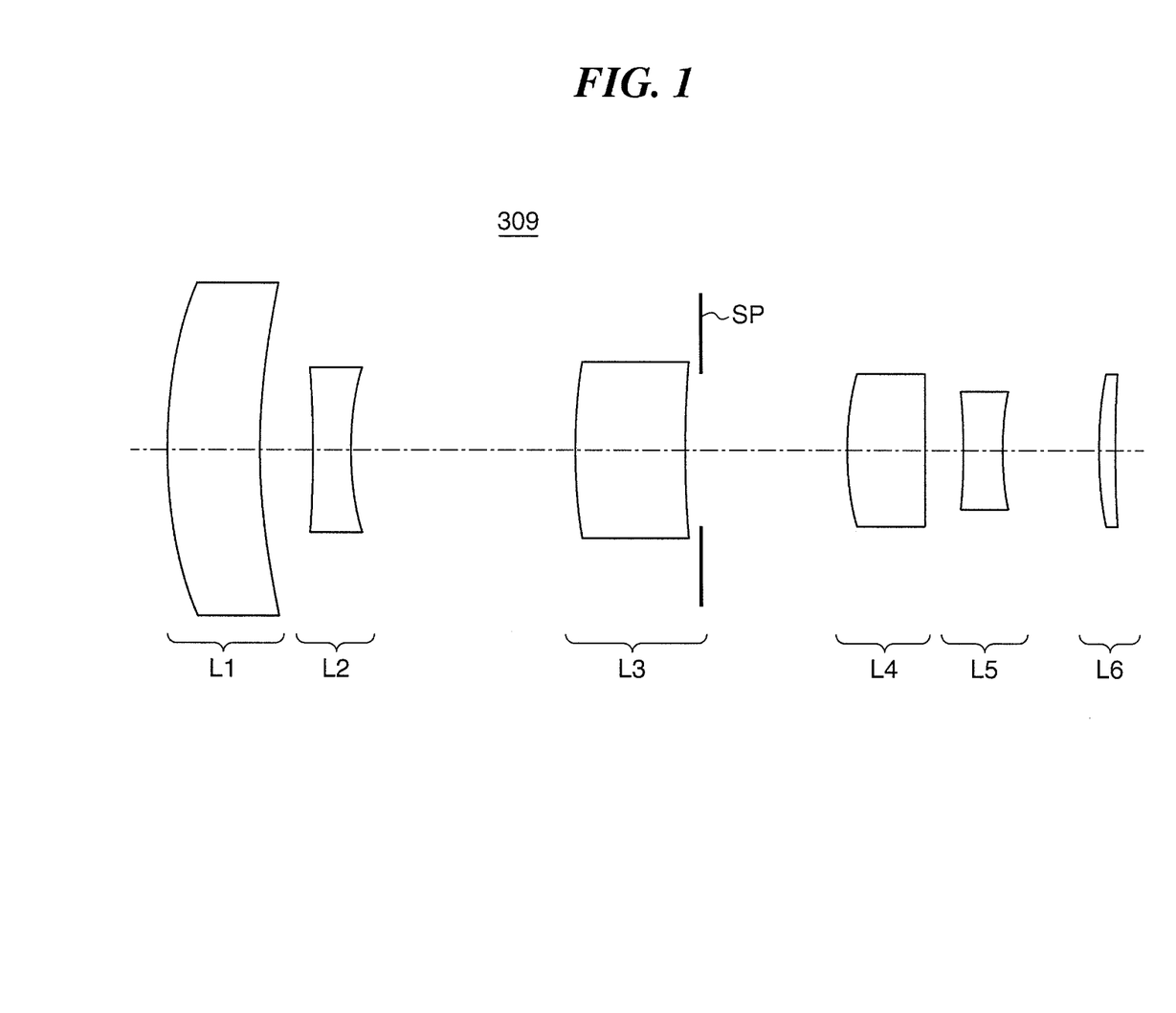
FIG. 1 is a view schematically showing an example of a varifocal type lens unit that is provided in an image pickup apparatus according to a first embodiment of this invention.
Figure 3:
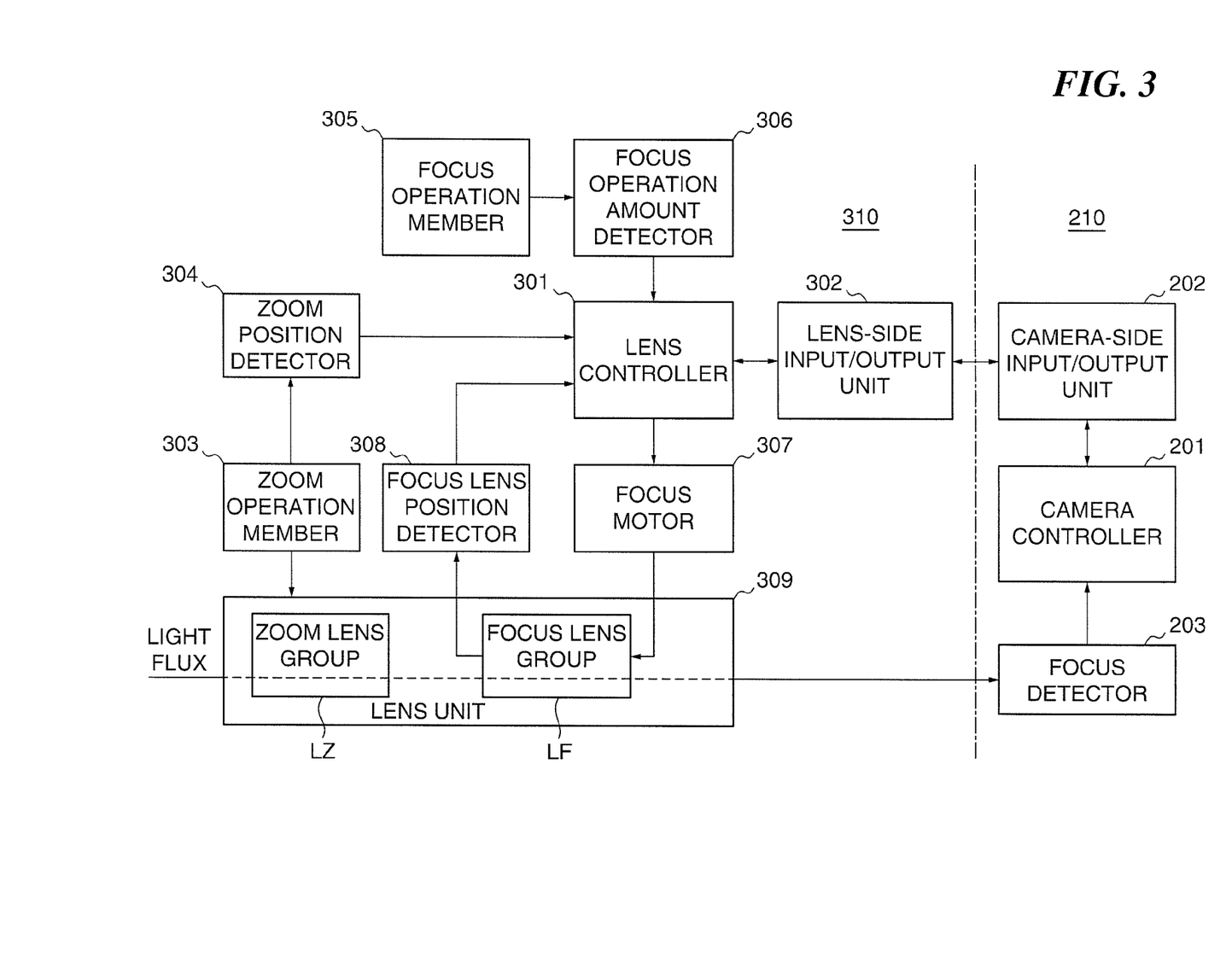
FIG. 3 is a block diagram showing an example construction of a camera, which is an example of the image pickup apparatus attached with the lens unit.

FIG. 1 schematically shows an example of a varifocal type lens unit that is provided in an image pickup apparatus according to a first embodiment of this invention, and FIG. 3 shows in block diagram an example construction of a camera, which is an example of the image pickup apparatus.

The varifocal type lens unit (hereinafter, simply referred to as the lens unit) 309 shown in FIG. 1 cooperates with a lens unit drive control system shown in FIG. 3 to constitute a lens unit assembly, which is attached to a main unit of the image pickup apparatus, e.g., a main unit of a single-lens reflex digital camera (hereinafter, referred to as the camera main unit).

As shown in FIG. 1, the lens unit 309 has first to sixth lens groups L1-L6. Each of the first, third, fourth, and sixth lens groups L1, L3, L4 and L6 has a positive refractive power, and each of the second and fifth lens groups L2 and L5 has a negative refractive power.

An aperture SP is disposed between the third and fourth lens groups L3 and L4 so as to be close to the third lens group L3. An imaging element (not shown) e.g. a CMOS imaging sensor is disposed on an imaging face (not shown) located on the right side of the sixth lens group L6 in FIG. 1. The imaging element outputs an image signal according to an optical image (object image) formed on the imaging element by a light flux passing through the lens unit 309.

In FIG. 1, there is shown a state where the lens unit 309 is at a wide-angle end. When a zoom operation is performed from wide-angle end toward telephoto end, the first and third lens groups L1, L3 are driven toward the left side in FIG. 1 and the fourth to sixth lens groups L4-L6 are integrally driven to the left side in FIG. 1. In other words, a zoom action is performed responding to the zoom operation. When the focal position of the lens unit 309 changes with execution of the zoom operation, the fifth lens group (more generally, a focus lens) L5 is singly driven so as to maintain the focal position constant. In other words, a focus action is performed.

The illustrated lens unit 309 has a so-called rear-focus construction in which when focusing is performed from infinite-distance object to close-distance object, the fifth lens group L5 is driven toward the imaging face. With the rear-focus construction, the fifth lens group L5 (focus lens) can be small-sized, even if the lens unit 309 is configured to be capable of performing zooming in high magnification. By using a low-priced and small-sized actuator, both a wobbling operation for moving-image photographing and a high speed driving for still-image photographing can be achieved.

It should be noted that an amount of movement of the fifth lens group L5 is different between wide-angle end side and telephoto end side in the lens unit 309 when focusing is performed from infinite-distance object to close-distance object. The amount of movement of the fifth lens group L5 increases from the wide-angle end toward the telephoto end.

Figure 2:
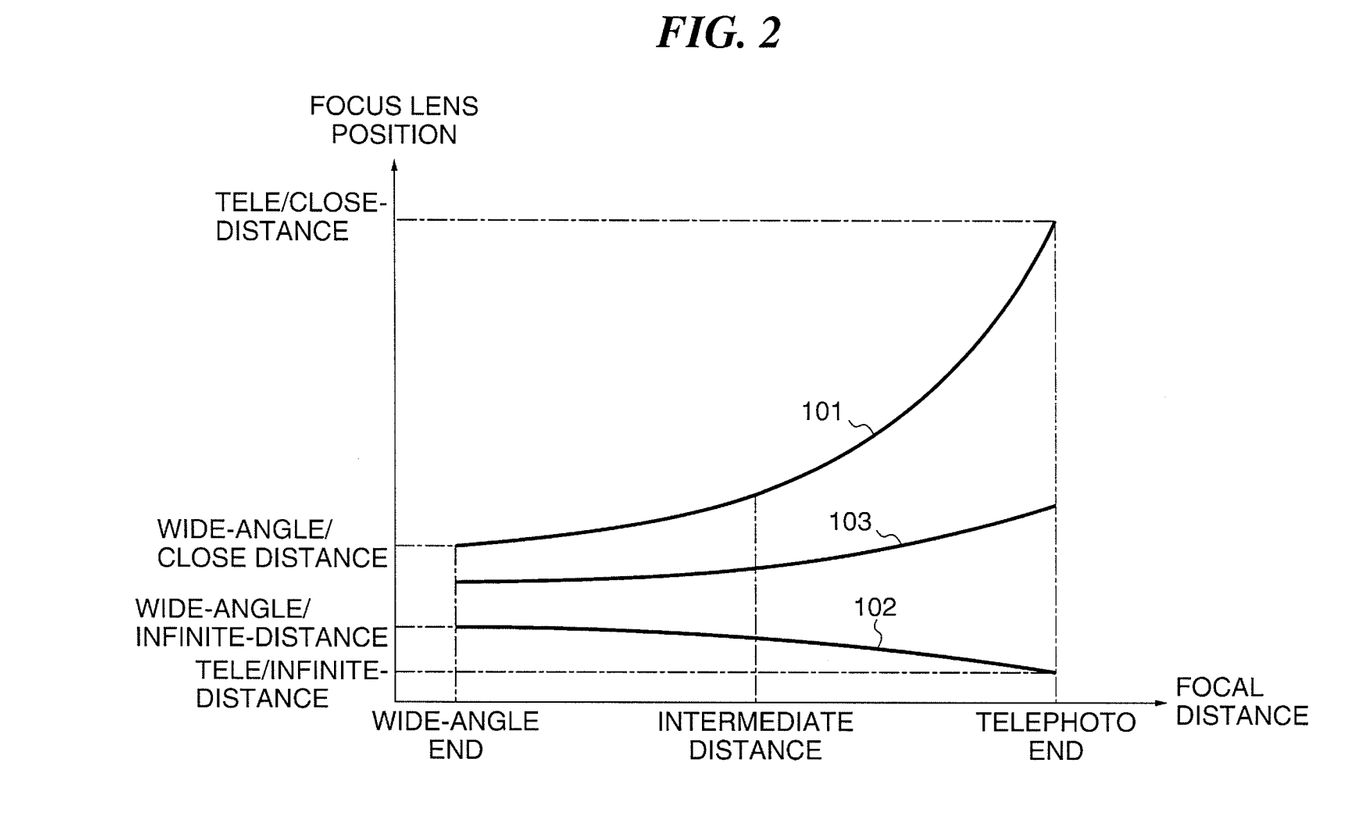
FIG. 2 is a view showing a relation between focal distance and focus lens position in the lens unit.

FIG. 2 shows a relation between focal distance and focus lens position in the lens unit 309.

In FIG. 2, the focal distance that changes with execution of zoom operation is shown taken along the abscissa. The left side (origin side) and right side of the abscissa correspond to wide-angle end and telephoto end, respectively. The position of the focus lens L5 is shown taken along the ordinate. The lower side (origin side) and upper side of the ordinate correspond to object side and image face side of the lens unit 309, respectively.

Loci 101-103 are moving loci of the focus lens L5 in cases where the object is a close-distance object, an infinite-distance object, and an intermediate-distance object, respectively.

At the time of zooming from wide-angle end to telephoto end, the fourth to sixth lens groups L4-L6 are integrally driven, and the fifth lens group L5 is driven along any of the loci 101-103 shown in FIG. 2 in order to maintain the focal position constant.

In a case that the object is a close-distance object, the focus lens L5 is moved by a large amount along the locus 101 from wide-angle/close-distance to tele/close-distance on the ordinate. On the other hand, in a case that the object is an infinite-distance object, the focus lens L5 is moved by a small amount from wide-angle/infinite-distance to tele/infinite-distance on the ordinate along the locus 102.

As described above, at the time of zooming from wide-angle end to telephoto end, the focus lens must be more largely moved in the case of close-distance object than in the case of infinite-distance object. During the zoom operation, the focus lens is moved along one of the loci shown in FIG. 2, whereby the focal position can be maintained constant.

In the following, an example construction of the camera will be described with reference to FIG. 3.

As shown in FIG. 3, the camera has a camera main unit 210 shown on the right side of a vertical dotted line and a lens unit assembly 310 shown on the lest side of the vertical dotted line. The lens unit assembly 310 is interchangeably coupled to the main unit 210 by means of a mount mechanism (not shown).

The camera main unit 210 has a camera controller 201 for controlling the entire camera and has a camera-side input/output unit 202 connected to a lens-side input/output unit 302 of the lens unit assembly 310. Various data such as image data is exchanged between the input/output units 202 and 302.

The camera main unit 210 has a focus detector 203 that detects a focal position of the lens unit 309 based on light flux (optical image) entered via the lens unit 309. The focus detector 203 outputs a focus detection signal that represents a result of focus detection. Based on the focus detection signal, the camera controller 201 drives and controls a focus lens group LF via the lens controller 301 according to a focus adjustment program, whereby a focus adjustment is performed.

In the lens unit assembly 310, the lens unit 309 has a zoom lens group LZ that corresponds to the first and third to sixth lens groups L1 and L3-L6 shown in FIG. 1 and the focus lens group LF (more generally, a focus lens) that corresponds to the fifth lens group L5 shown in FIG. 1.

The zoom operation member 303 is mechanically coupled to the zoom lens group LZ. The photographer (user) can zoom the lens unit 309 by operating the zoom operation member 303. More specifically, the zoom lens group LZ moves along an optical axis of the lens unit 309 according to operation amount and operation time of the zoom operation member 303. In other words, a zoom action is performed responding to the zoom operation.

The zoom position detector 304, which is mechanically coupled to the zoom operation member 303, detects the operation amount, operation direction, and operation speed of the zoom operation member 303 operated by the user, and outputs, to the lens controller 301, zoom operation information that represents a detection result.

The focus operation member 305 is configured to be directly operated by the user, but is not directly mechanically coupled to the focus lens group LF. The focus lens group LF moves along the optical axis when the focus motor 307 is driven by the lens controller 301 according to a user's operation of the focus operation member 305. In other words, a focus action is performed.

The focus operation amount detector 306 is connected to the focus operation member 305 and to the lens controller 301. The focus operation amount detector 306 detects the operation amount, operation direction, operation speed, etc. of the focus operation member 305 operated by the user, and outputs focus operation information representing a detection result to the lens controller 301.

The focus motor 307 is mechanically coupled to the focus lens group LF. In this example, e.g. a stepping motor is used as the focus motor 307, and a rack that holds the focus lens group LF is engaged with a screw formed on a rotary shaft of the motor. With motor rotation, the focus lens group LF moves along the optical axis.

The focus lens position detector 308 detects a position of the focus lens group LF. In a case that a stepping motor is used as the focus motor 307, the focus lens position detector 308 is provided with a photo interrupter and a light-shielding plate. The position detector 308 obtains origin position information of the focus lens group LF, counts a stepping motor driving pulse to detect a position of the focus lens group LF, and outputs focus lens position information representing the detected position.

It is assumed here that the zoom operation member 303 is operated by the user from the side of wide-angle end toward telephoto end in an in-focus state to the object. In that case, before the zoom operation member 303 is operated, the lens controller 301 calculates a distance to the object (object distance) based on focal distance (zoom operation information) and focus lens position information.

Next, when the zoom operation member 303 is operated to the telephoto end, the zoom position detector 304 detects a change in zoom position caused by the operation of the zoom operation member 303 (zoom operation), and outputs, to the lens controller 301, zoom operation information that represents a detection result.

The lens controller 301 calculates an object distance based on the zoom operation information and the focus position information. According to the calculated object distance, the lens controller 301 selects one of the loci, which are shown in FIG. 2 and which are stored beforehand in the lens controller 301. Then, the lens controller 301 drives and controls the focus motor 307 according to the selected locus, whereby the focus lens group LF is moved along the optical axis so that the focal position that changes with the zoom operation is made constant. As a result, a change in optical image-formed position on the imaging element caused by the zoom operation is corrected, thereby realizing the zoom operation in which the focal position does not change and a sense of incongruity is not caused.

Since the zoom operation member 303 is mechanically coupled to the zoom lens group LZ, the zoom operation is sometimes performed at a high speed depending on how the zoom operation is performed by the user. In a high-speed zoom operation, the zoom position largely changes, so that the focal position largely changes. Thus, the focus motor 307 is driven at high speed in order to drive the focus lens group LF at high speed to make the focal position constant. However, when the driving speed of the focus motor 307 reaches an upper limit speed, a delay is caused in focus action (i.e., in the follow-up movement of the focus lens group LF) relative to a zoom action performed responding to the zoom operation. In other words, a focus follow-up delay is caused. As already described with reference to FIG. 2, the amount of movement of the focus lens group LF at the time of zooming from wide-angle end to telephoto end becomes extremely large in the case of close-distance object, so that the focus follow-up delay is likely to occur.

Figure 4A:
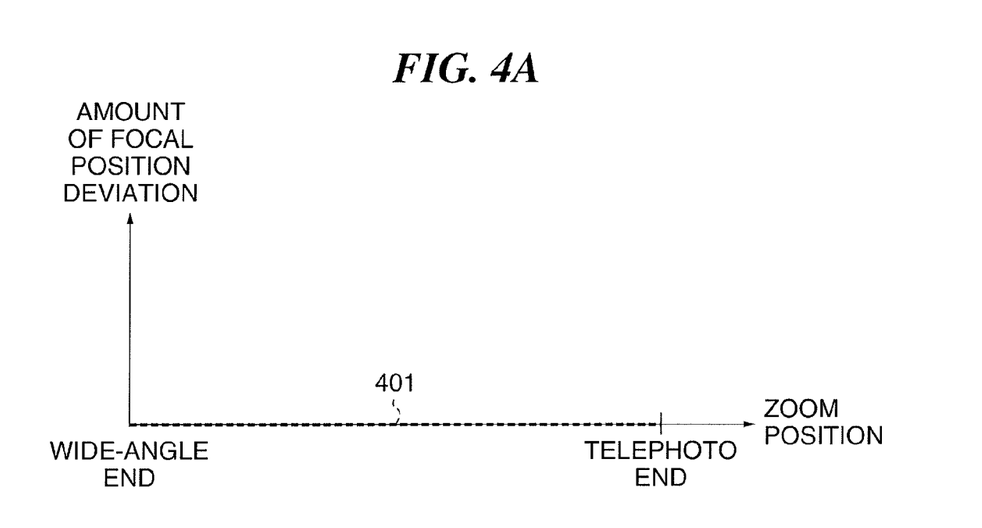
FIGS. 4A and 4B are views showing a change in the amount of focal position deviation when zooming is performed from wide-angle end toward telephoto end in a state where the camera shown in FIG. 3 is in focus with an infinite-distance object and showing a change in the amount of focal position deviation when such zooming is performed in a state where the camera is in focus with a close-distance object.
Figure 4B:
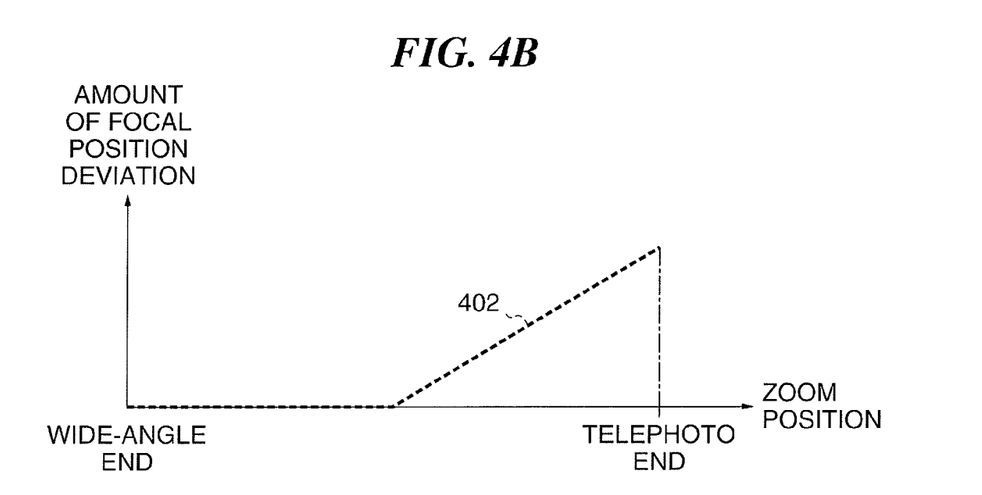

FIGS. 4A and 4B each show a delay in follow-up movement of the focus lens group LF relative to zoom operation.

In FIGS. 4A and 4B, zoom position is shown taken along the abscissa. The origin position on the left side of abscissa corresponds to wide-angle end, and the right side of abscissa corresponds to telephoto end. Amount of focal position deviation (i.e., defocusing amount) is shown taken along the ordinate. A dotted line 401 in FIG. 4A shows a change of focal position deviation amount at the time of zooming from wide-angle end to telephoto end at a relatively low speed in an in-focus state to an infinite-distance object. A dotted line 492 in FIG. 4B shows a change of focal position deviation amount at the time of zooming from wide-angle end to telephoto end at a relatively high speed in an in-focus state to a close-distance object.

In the case of infinite-distance object, an amount of movement of the focus lens group LF required to follow the zoom operation is small as shown by the locus 103 in FIG. 2. Accordingly, to move the focus lens group LF following the zoom operation, it is enough to drive the focus motor 307 at a speed equal to or less than an upper limit speed of the motor, and no focal position deviation is caused as shown by the dotted line 401. In other words, a delay is not caused in the follow-up movement of the focus lens group LF relative to the zoom operation.

On the other hand, in the case of close-distance object, an amount of movement of the focus lens group LF required to follow the zoom operation is extremely large as shown by the locus 101 in FIG. 2. Accordingly, even if the focus motor 307 is driven at the upper limit speed, a focal position deviation is caused in the middle of zoom operation as shown by the dotted line 402, and becomes maximum at the telephoto end. In other words, a delay is caused in the follow-up movement of the focus lens group LF relative to the zoom operation (i.e., a focus follow-up delay is caused). If a required amount of movement of the focus lens group LF is large, a focus follow-up delay is therefore inevitably caused.

The degree of focus follow-up delay depends on the operation speed of the zoom operation member 303 and on the driving speed of the focus motor 307. With increase of the operation speed of the zoom operation member 303, the focus follow-up delay is more likely to occur. The focus follow-up delay due to insufficient driving speed of the focus motor 307 is gradually eliminated with lapse of time, whereby an in-focus state is achieved. However, in a state where the focus follow-up delay is large, i.e., in a large blurred state, it is impossible to perform the focus detection satisfactorily. Thus, a focus search operation must be made, so that a long time is required to achieve focusing.

In this embodiment, a focus follow-up action (described below) is performed by the lens controller 301 under the control of the camera controller 201 according to an operation program (focus detection algorithm) stored in the camera controller 201. As a result, the focus lens is moved to satisfactorily follow the zoom operation, whereby a situation where a search focus operation must be made can be avoided.

Figure 5:
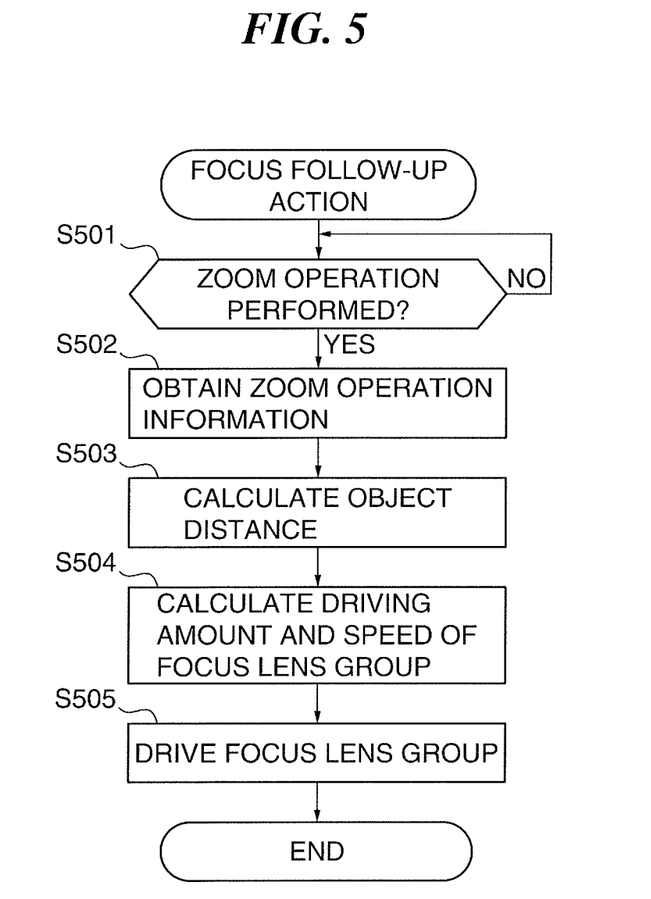
FIG. 5 is a flowchart showing a focus follow-up action executed by the camera shown in FIG. 3 in response to execution of zoom operation.

FIG. 5 shows in flowchart a focus follow-up action executed by the camera of FIG. 3 in response to execution of zoom operation.

Referring to FIG. 5, the lens controller 301 determines based on zoom operation information that is output from the zoom position detector 203 whether or not a zoom operation (an operation of the zoom operation member 303) is performed (step S501). If no zoom operation is performed (NO to step S501), the lens controller 301 waits for a zoom operation.

When a zoom operation is performed (YES to step S501), the lens controller 301 obtains, from the zoom position detector 304, zoom operation information that represents the operation amount, operation direction, and operation speed of the zoom operation member 303 (step S502). Next, the lens controller 301 calculates an object distance based on a focal distance obtained immediately before execution of the zoom operation and focus lens position information output from the focus lens position detector 308 (step S503).

In a memory of the lens controller 301, amounts of drive of the focus lens group LF required to move the focus lens group LF to follow the zoom operation, i.e., the loci shown in FIG. 2, are stored beforehand to correspond to object distances.

The lens controller 301 calculates a driving amount and driving speed of the focus lens group LF based on the zoom operation information obtained in step S502 and the object distance calculated in step S503, while referring to the stored contents of the memory (step S504). Then, the lens controller 301 drives and controls the focus motor 307 based on the calculated driving amount and driving speed, thereby driving the focus lens group LF along the optical axis (step S505), whereupon the focus follow-up action of FIG. 5 is completed.

In steps S501 to S505, the focus lens group LF is repeatedly driven at intervals of e.g. several tens msec based on the zoom operation information detected at intervals of e.g. several tens msec, thereby improving response of follow-up movement of the focus lens group LF relative to the zoom operation.

However, if there is a delay in driving the focus motor 307 in step S505, the focus lens group LF cannot be driven in time for the corresponding detected zoom operation information, so that a delay is caused in the follow-up movement of the focus lens group LF relative to the zoom operation. In other words, a focus follow-up delay is caused.

Figure 6:
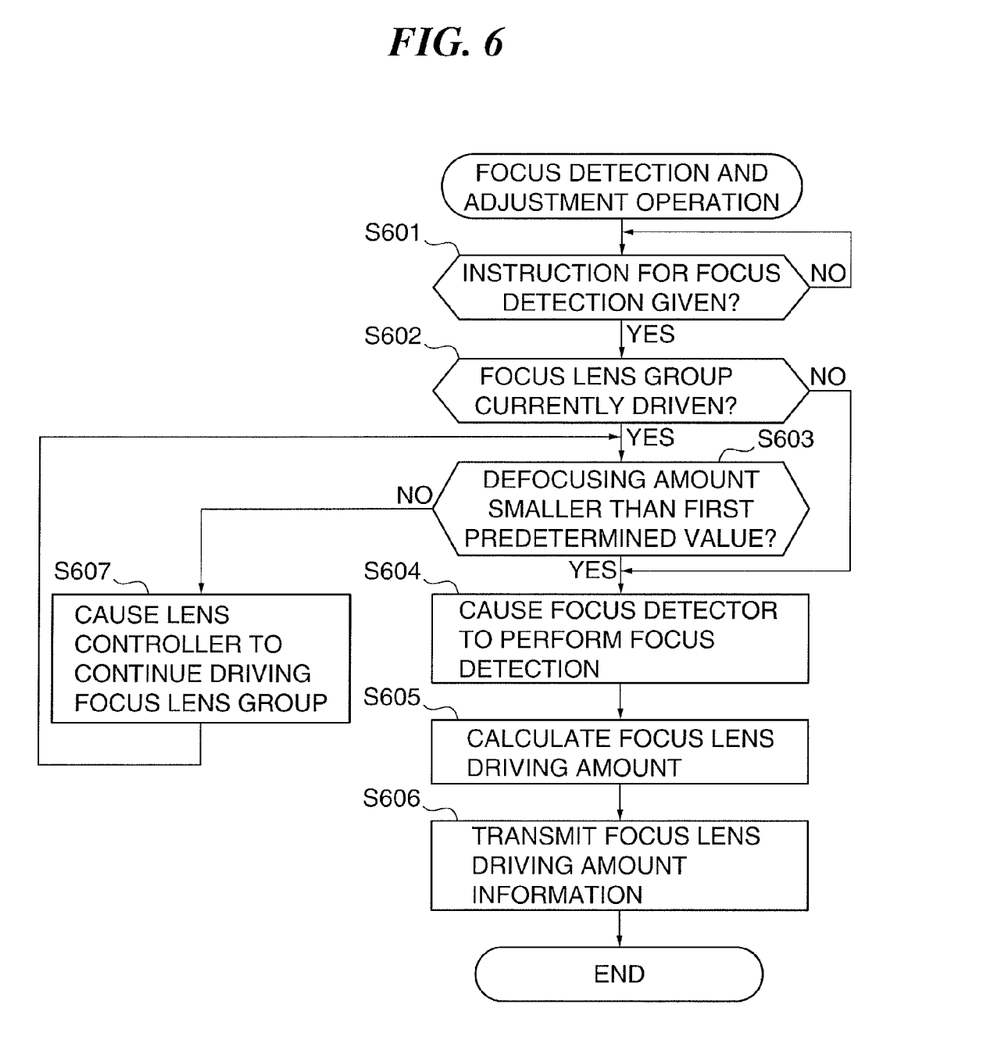
FIG. 6 is a flowchart showing a focus detection and adjustment operation executed by the camera of FIG. 3 in response to an instruction for focus detection.

FIG. 6 shows in flowchart a focus detection and adjustment operation executed by the camera of FIG. 3 in response to an instruction for focus detection. It should be noted that the focus detection and adjustment operation is started e.g. when the user operates an operation button (not shown) or other operation device to thereby instruct the camera controller 201 to execute the focus detection. The focus detection and adjustment operation is executed according to an operation program stored in the camera controller 201.

Referring to FIG. 6, the camera controller 201 determines whether or not an instruction for focus detection is given (step S601). If no instruction for focus detection is given (NO to step S601), the camera controller 201 waits for an instruction for focus detection. On the other hand, if an instruction for focus detection is given (YES to step S601), the camera controller 201 notifies the lens controller 301 via the input/output units 202, 302 that the instruction for focus detection has been given. In response to this, the lens controller 301 drives the focus lens group LF such that the lens group LF moves following the zoom operation.

Next, the camera controller 201 determines whether the focus lens group LF is being currently driven by the lens controller 301 (step S602). If the focus lens group LF is not being driven (NO to step S602), the camera controller 201 sequentially executes processing in step S604 and subsequent steps, which will be described later.

If the defocusing amount becomes large due to a delay in follow-up movement of the focus lens group LF relative to zoom operation (i.e., due to a focus follow-up delay), an image becomes blurred, and it therefore becomes difficult to perform focus detection satisfactorily. In that case, a focus search operation is generally performed, and a long time is required to achieve focusing.

To eliminate such inconveniences, in the focus detection and adjustment operation of FIG. 6, if the focus lens group LF is being driven (YES to step S602), the camera controller 201 determines based on the focus detection signal supplied from the focus detector 203 whether or not an amount of current focal position deviation (defocusing amount) is smaller than a first predetermined value (step S603).

Although not illustrated in FIG. 3, the focus detector 203 has a first focus detection unit that performs focus detection based on a phase difference method using a secondary image forming optical system, and has a second focus detection unit that performs focus detection based on an image signal supplied from the imaging element. In that case, an allowable limit of image blur degree is different between the first and second focus detection units, and the first predetermined value of defocusing amount is set to a value different between the first and second focus detection units. The first predetermined value is switched according to which of the two focus detection units is designated by the user.

If the defocusing amount is smaller than the first predetermined value (YES to step S603), the camera controller 201 causes the lens controller 301 to stop the follow-up movement of the focus lens group LF relative to the zoom operation, and causes the focus detector 203 to perform focus detection (step S604).

Next, the camera controller 201 calculates a focus lens driving amount based on the focus detection signal that is supplied from the focus detector 203 and that represents the amount of focal position deviation (step S605), and causes the input/output unit 202 to transmit information representing the calculated focus lens driving amount to the lens controller 301 (step S606). Then, the focus detection and adjustment operation of FIG. 6 is completed.

The lens controller 301 drives and controls the focus motor 307 according to the focus lens driving amount represented by the information transmitted from the camera controller 201, thereby moving the focus lens group LF along the optical axis to follow the zoom operation.

If the defocusing amount is equal to or larger than the first predetermined value (NO to step S603), the camera controller 201 causes the lens controller 301 to continue driving the focus lens group LF (step S607). Then, the camera controller 201 returns to step S603 in which it is again determined whether the defocusing amount is smaller than the first predetermined value.

In short, if determined in step S603 that the defocusing amount due to a focus follow-up delay is equal to or larger than the first predetermined value, the camera controller 201 prohibits execution of the focus detection and adjustment. More specifically, if the defocusing amount is large, the camera controller 201 does not proceed to step S604 where the focus detection is controlled to be executed, but proceeds step S607 where the focus lens driving is controlled to be executed preferentially to the focus detection until the defocusing amount becomes smaller than the first predetermined value.

Figure 7:
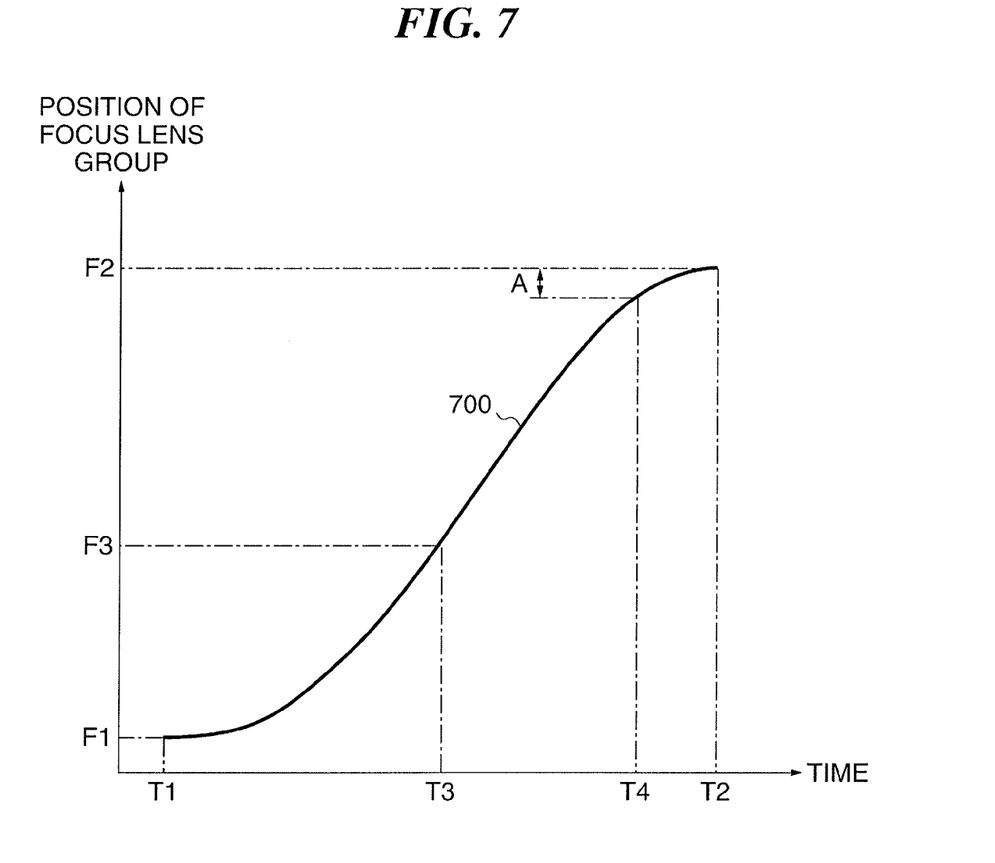
FIG. 7 is a view showing a relation between time and focus lens group position in the camera shown in FIG. 3 during a follow-up movement of the focus lens group relative to a zoom operation.

FIG. 7 shows a relation between time and focus lens group position in the camera shown in FIG. 3 during a follow-up movement of the focus lens group LF relative to a zoom operation.

In FIG. 7, time is shown taken along the abscissa and position of the focus lens group LF is shown taken along the ordinate. A curved line 700 corresponds to the moving locus 101 of the focus lens L5, which is shown in FIG. 2. More specifically, the curved line 700 represents a moving locus of the focus lens group LF that is observed when the focus lens group LF is moved at a maximum speed to follow the zoom operation performed from wide-angle end to telephoto end in the case of close-distance object.

As shown in FIG. 7, when the focus lens group LF is moved at the maximum speed, the movement of the focus lens group LF started from a focus lens group position F1 at a time point T1 is completed at a time point T2 at which a focus lens group position F2 is reached. In other words, if the zoom operation started from the wide-angle end at the time point T1 is performed in such a manner that the telephoto end is reached at or after the time point T2, the follow-up movement of the focus lens group LF does not lag behind the zoom operation. In other words, no focus follow-up delay is caused.

On the other hand, if the zoom operation started from the wide-angle end at the time point T1 is performed in such a manner that the telephoto end is reached at a time point T3, the focus lens group LF is still at a focus lens group position F3 at the time point T3 even when the focus lens group LF is moved at the maximum speed. In other words, a delay corresponding to a distance between the focus lens positions F2 and F3 is caused in the follow-up movement of the focus lens group LF relative to the zoom operation, and defocusing is caused by the focus follow-up delay. It should be noted that the focus follow-up delay and the resultant defocusing are eliminated at the time point T2.

In the focus detection and adjustment operation of FIG. 6, the focus detection is not executed until the defocusing amount due to the focus follow-up delay becomes smaller than the first predetermined value that corresponds to a width A (a movement amount of focus lens group) shown in FIG. 7.

With the focus detection and adjustment operation of FIG. 6, the focus detection is not executed from a time point (around the time point T3) at which the defocusing amount becomes equal to or larger than the first predetermined value to a time point T4 at which the focus lens group LF reaches a focus lens group position (F2-A) short of the position F2 by the width A. The camera controller 201 waits for the defocusing amount becoming equal to or less than the first predetermined value, and performs the focus detection and adjustment at or after the time point T4 to attain an in-focus state.

As a result, in this embodiment, a focusing operation can be carried out in short time and with accuracy, even if a large focal position deviation is caused due to a delay in follow-up movement of the focus lens group LF relative to the zoom operation.

(Second Embodiment)

In the following, a description will be given of an image pickup apparatus according to a second embodiment of this invention.

The image pickup apparatus (camera) of this embodiment is the same in basic construction as the camera shown in FIG. 3 and has the lens unit shown in FIG. 1.

Figure 8:
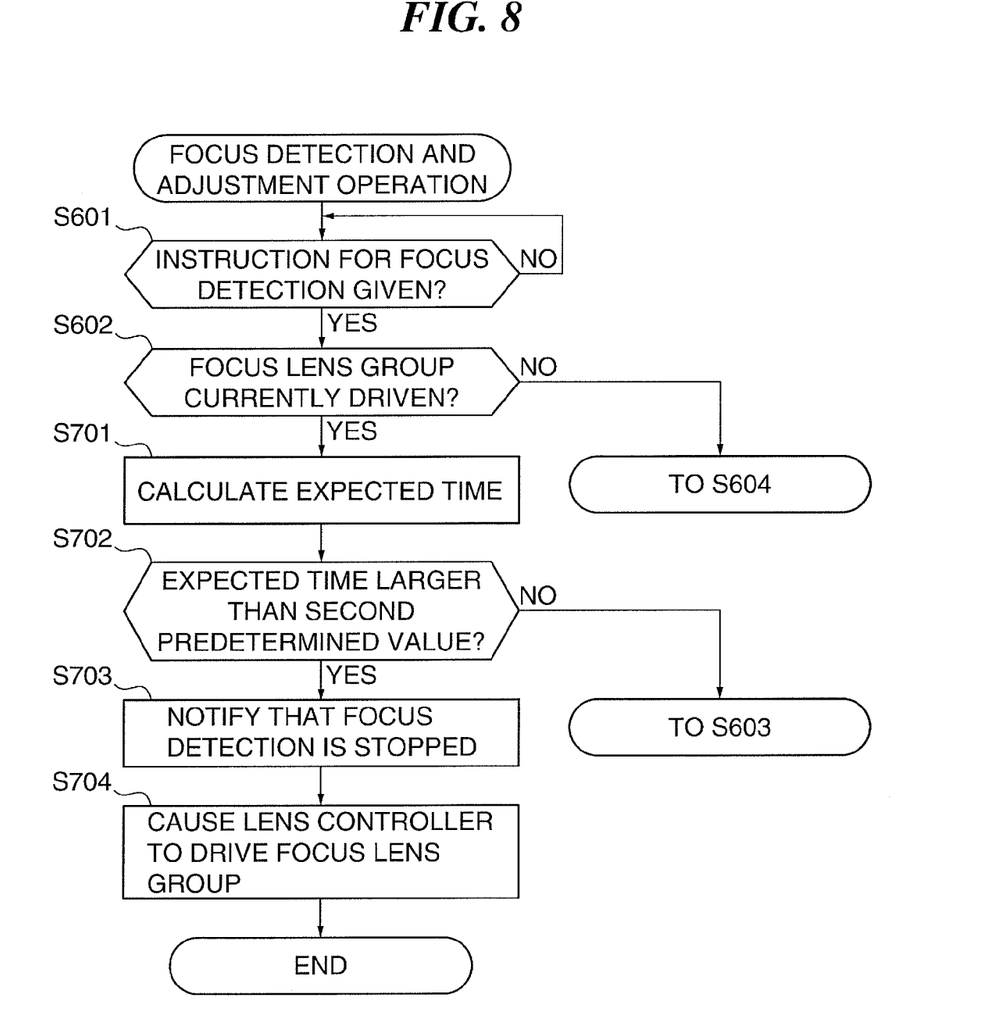
FIG. 8 is a flowchart showing a focus detection and adjustment operation executed in response to an instruction for focus detection by a camera according to a second embodiment of this invention.

FIG. 8 shows in flowchart a focus detection and adjustment operation executed by the camera of this embodiment in response to an instruction for focus detection.

It should be noted that the focus detection and adjustment operation of FIG. 8 is basically the same as that of FIG. 6, but differs in that the focus detection is stopped when it is expected that a time is required until the defocusing amount becomes less than a predetermined value. In FIG. 8, steps that are the same as those of FIG. 6 are denoted by the same reference symbols or numerals, and a description thereof will be partly omitted.

Referring to FIG. 8, if determined in step S601 that an instruction for focus detection is given, the camera controller 201 notifies the lens controller 301 that the instruction for focus detection has been given. The lens controller 301 drives the focus lens group LF so that the lens group LF is moved following a zoom operation, thereby attaining an in-focus state. However, if a time is required from when focus detection is instructed to when focus adjustment is completed, there is a time lag to attain an in-focus state. In that case, there is a possibility that the photographer feels a sense of incongruity or performs focusing on another object.

To obviate such inconveniences, in the focus detection and adjustment operation of FIG. 8, if determined in step S602 that the focus lens LF is being currently driven by the lens controller 301, the camera controller 201 calculates a time expected to be required until a defocusing amount due to a delay in follow-up movement of the focus lens group LF relative to the zoom operation becomes less than the first predetermined value (step S701). This expected time is calculated based on a distance from a current position to a target moving position of the focus lens group LF and the driving speed of the focus motor 307.

Next, the camera controller 201 determines whether or not the expected time is larger than a second predetermined value that represents a predetermined time (step S702). If the expected time is equal to or less than the second predetermined value (NO to step S702), the flow proceeds to step S603 in FIG. 6.

On the other hand, if the expected time is larger than the second predetermined value (YES to step S702), the camera controller 201 performs control to stop the focus detection and performs control to cause a display device (not shown) of the camera to display a message or cause a speaker (not shown) of the camera to generate a voice message to notify the user that the focus detection is stopped (step S703).

Next, the camera controller 201 causes the lens controller 301 to drive the focus lens group LF in such a manner that the focus lens group LF is moved following the zoom operation (step S704), whereupon the focus detection and adjustment operation of FIG. 8 is completed.

As described above, according to this embodiment, if a time is required from when execution of focus detection is instructed to when an in-focus state is achieved, the focus detection is stopped and the focus lens group LF is driven and moved following the zoom operation. Thus, a focusing operation can be quickly carried out, without giving the user a sense of incongruity. Furthermore, a focus adjustment can be carried out in short time and with accuracy, even if a large focal position deviation (defocusing amount) is caused by a zoom operation.

As apparent from the foregoing description, the camera controller 201, lens controller 301, zoom position detector 304, and focus motor 307, which are shown in FIG. 3, function as a follow-up unit of this invention. The focus detector 203, camera controller 201, lens controller 301, focus lens position detector 308, and focus motor 307 function as an auto-focus adjustment unit of this invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-135141, filed Jun. 27, 2013, which is hereby incorporated by reference herein in its entirety.

What is claimed is:

1. An image pickup apparatus, comprising:
   at least one processor or circuitry configured to perform:
   a follow-up action where a focus action, in which a focus lens is moved in an optical axis direction so as to correct a change in optical image-formed position on an imaging element caused by a zoom operation, is followed to a zoom action that is performed responding to the zoom operation; and
   an auto-focus adjustment by moving the focus lens in the optical axis direction according to a focus detection result,
   wherein in a case where an instruction for the auto-focus adjustment is given while the follow-up action is being performed, said at least one processor or circuitry controls to operate in a mode in which the auto-focus adjustment is not executed until a defocusing amount obtained from the focus detection result becomes smaller than a predetermined value.

2. The image pickup apparatus according to claim 1, wherein in the mode, said at least one processor or circuitry executes the auto-focus adjustment in a case where the follow-up action is not being performed when the instruction for the auto-focus adjustment is given.

3. The image pickup apparatus according to claim 1, wherein in the mode, said at least one processor or circuitry determines a time expected to be required until the defocusing amount becomes less than the predetermined value based on a distance from a current position of the focus lens to a target position to which the focus lens is to be driven and a driving speed of the focus lens, and if the time expected is equal to or less than a predetermined time, said at least one processor or circuitry determines whether the defocusing amount is less than the predetermined value.

4. An imaging method, comprising:
   a follow-up unit step of performing a follow-up action where a focus action, in which a focus lens is moved in an optical axis direction so as to correct a change in optical image-formed position on an imaging element caused by a zoom operation, is followed to a zoom action that is performed responding to the zoom operation; and
   an auto-focus adjustment step of performing an auto-focus adjustment by moving the focus lens in the optical axis direction according to a focus detection result,
   wherein in a case where an instruction for the auto-focus adjustment is given while the follow-up action is being performed in said follow-up step, the auto-focus adjustment is not executed in said auto-focus adjustment step until a defocusing amount obtained from the focus detection result becomes smaller than a predetermined value.

* * * * *